US012374168B2

(12) United States Patent
McMenamin, Jr. et al.

(10) Patent No.: US 12,374,168 B2
(45) Date of Patent: Jul. 29, 2025

(54) TEST ROVER APPARATUS

(71) Applicant: FORD GLOBAL TECHNOLOGIES, LLC, Dearborn, MI (US)

(72) Inventors: Thomas Daniel McMenamin, Jr., Oakmont, PA (US); Raymond Leonard, Brentwood, PA (US); Michael Brandl, Steingaden (DE); Timothy Riggs, Latrobe, PA (US); Sean William Shawgo, Pittsburgh, PA (US); Dustin Ryan Yautz, Wexford, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 17/981,098

(22) Filed: Nov. 4, 2022

(65) Prior Publication Data
US 2024/0153320 A1 May 9, 2024

(51) Int. Cl.
*G01C 21/00* (2006.01)
*G01C 21/34* (2006.01)
(Continued)

(52) U.S. Cl.
CPC ............. *G07C 5/008* (2013.01); *G01C 21/34* (2013.01); *G01S 17/86* (2020.01); *G01S 17/931* (2020.01);
(Continued)

(58) Field of Classification Search
CPC ...... G07C 5/008; G01C 21/34; G01C 21/005; G01C 21/3415; G01C 21/00; G01S 17/86;
(Continued)

(56) References Cited

U.S. PATENT DOCUMENTS

| | | | |
|---|---|---|---|
| 2010/0243344 A1* | 9/2010 | Wyrobek | B25J 19/0016 180/21 |
| 2015/0210329 A1* | 7/2015 | Hutcheson | B62D 61/12 180/209 |

(Continued)

OTHER PUBLICATIONS

ABDynamics Products, <https://www.abdynamics.com/resources/files/SP-6014-LaunchPad-Specification.pdf>, retrieved on Nov. 4, 2022, 2 pages.
(Continued)

*Primary Examiner* — Shardul D Patel
(74) *Attorney, Agent, or Firm* — Frank A. MacKenzie; Brooks Kushman P.C.

(57) ABSTRACT

Disclosed herein is a test rover apparatus, a test system and a test method using the test rover apparatus. For example, the test rover apparatus is provided with a chassis that is configured to support an object representing a mobile actor, and a motor that is coupled to at least one wheel. At least one spring is coupled between the at least one wheel and the chassis to: bias the at least one wheel to extend out of the cavity to engage an underlying surface, and compress in response to a load being applied to the top of the chassis thereby retracting the at least one wheel into the cavity. A controller is configured to control the motor to drive the at least one wheel to propel the chassis along a predetermined route that is based on simulation data and corresponds to a maneuver of the mobile actor.

20 Claims, 12 Drawing Sheets

(51) Int. Cl.
*G01S 17/86* (2020.01)
*G01S 17/931* (2020.01)
*G05B 17/02* (2006.01)
*G07C 5/00* (2006.01)
*B60W 50/04* (2006.01)

(52) U.S. Cl.
CPC .............. *G05B 17/02* (2013.01); *B60W 50/04* (2013.01); *B60W 2710/20* (2013.01); *B60W 2720/10* (2013.01)

(58) Field of Classification Search
CPC ...... G01S 17/931; G05B 17/02; B60W 50/04; B60W 2710/20; B60W 2720/10; G01M 17/00; G01M 17/007; G06F 11/3696
USPC ........................................................... 701/26
See application file for complete search history.

(56) References Cited

U.S. PATENT DOCUMENTS

2018/0071909 A1* 3/2018 Bewley .................. B62D 57/02
2019/0077018 A1* 3/2019 Hayashi ................. B25J 9/1664

OTHER PUBLICATIONS

ABDynamics Products, <https://www.abdynamics.com/resources/files/AB-Dynamics-LaunchPad-80-Solution-Brochure-ROW80.pdf>, retrieved on Nov. 4, 2022, 12 pages.
ABDynamics Products, <https://www.abdynamics.com/resources/files/AB-Dynamics-LaunchPad-80-Product-Specification-ROW.pdf>, retrieved on Nov. 4, 2022, 2 pages.

\* cited by examiner

TEST ROVER APPARATUS

TECHNICAL FIELD

One or more embodiments relate to a test rover apparatus to support objects representing mobile actors for physical testing of a vehicle system.

BACKGROUND

A vehicle system may monitor an environment external to a vehicle for obstacle detection and avoidance. The vehicle system may include multiple sensor assemblies for monitoring objects proximate to the vehicle in the near-field and distant objects in the far-field. Each sensor assembly may include one or more sensors, such as a camera, a radio detection and ranging (radar) sensor, a light detection and ranging (lidar) sensor, and a microphone. A lidar sensor includes one or more emitters for transmitting light pulses away from the vehicle, and one or more detectors for receiving and analyzing reflected light pulses. The vehicle system may determine the location of objects in the external environment based on data from the sensors, and control one or more systems, e.g., a powertrain, braking systems, and steering systems based on the locations of the objects.

During development, a vehicle system may be tested using simulation and physical, or real-world, testing. The physical testing may include system level testing conducted in a laboratory, and vehicle level testing conducted on a test track or in the field. The vehicle level testing may be used to validate and/or complement the simulation testing.

SUMMARY

In one embodiment, a test rover apparatus is provided with a chassis with a sidewall extending between a base and a top to define a cavity, the chassis is configured to support an object representing a mobile actor. The test rover apparatus is also provided with at least one wheel and a motor that is coupled to the at least one wheel. At least one spring is coupled between the at least one wheel and the chassis and configured to: bias the at least one wheel to extend out of the cavity to engage an underlying surface, and compress in response to a load being applied to the top of the chassis thereby retracting the at least one wheel into the cavity such that the base of the chassis contacts the underlying surface. A controller is configured to control the motor to drive the at least one wheel to propel the chassis along a predetermined route that is based on simulation data and corresponds to a maneuver of the mobile actor. The simulation data comprises a simulated environment and a model of the mobile actor performing the maneuver within the simulated environment.

In another embodiment, a test system is provided with a computer a test rover apparatus, and a vehicle system. The computer is configured to generate a predetermined route based on simulation data. The predetermined route being indicative of a maneuver of a mobile actor. The simulation data comprises a simulated environment and a model of the mobile actor performing the maneuver within the simulated environment. The test rover apparatus comprises: a chassis configured to support an object representing the mobile actor, a motor supported by the chassis and coupled to at least one wheel, and a controller configured to control the motor to propel the test rover apparatus along the predetermined route. The vehicle system comprises at least one optical sensor that is configured to detect the object representing the mobile actor external to a test vehicle.

In yet another embodiment a method is provided for testing a vehicle system using a test rover apparatus. A predetermined route is generated based on simulation data. The predetermined route is indicative of a maneuver of a mobile actor relative to a test vehicle. Wherein the simulation data comprises a simulated environment and a model of the mobile actor performing the maneuver within the simulated environment. At least one motor is controlled to propel a test rover apparatus along the predetermined route, wherein the test rover apparatus is configured to support an object representing the mobile actor. The object representing the mobile actor is detected external to a test vehicle.

DETAILED DESCRIPTION

Figure 1:
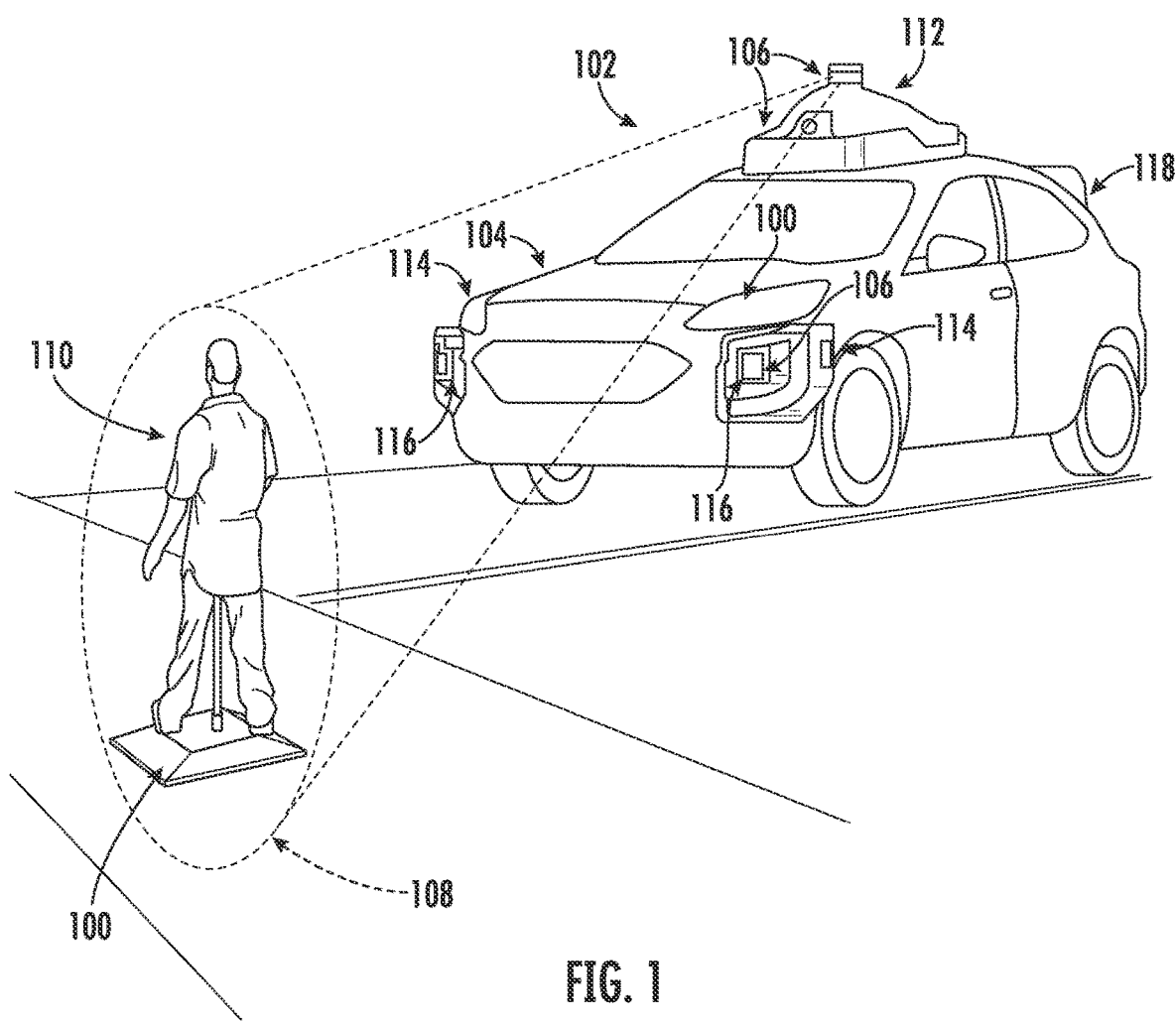
FIG. 1 is a front-perspective view of an exemplary vehicle with a self-driving system (SDS) and a test rover apparatus, in accordance with aspects of the disclosure.

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

During development, a self-driving system (SDS) may be tested using simulation and physical, or real-world, testing to validate its response to numerous test conditions involving remote actors, such as vehicles, pedestrians, and animals. Such simulation testing may allow for the creation of complex simulation routes, relatively easy modification of such complex simulation routes, and efficient testing because it does not require extensive coordination with other devices and actors. Simulation testing may be used to test the response of the SDS software to simulated inputs. For example, simulation testing may be used to verify motion planning and parts of motion control and prediction software. However, such simulation testing does not typically use the actual SDS sensors to monitor remote objects, and therefore does not verify such hardware.

Physical testing may be used to test the entire SDS 102, i.e., the whole stack end-to-end, including hardware (sensors) and software. A physical test that is derived from a simulated test may be used to validate the simulation. However, physical testing may be inefficient due to coordination with other systems and actors. Further, such testing may result in damage to the other systems and actors. The efficiency of the physical testing may be improved by remotely controlling an object to simulate an actor to perform a predetermined mission. Existing test technology for controlling the objects remotely is limited due to the inability of the technology to integrate with the SDS hardware and software, which may result in additional sensors, and shortcomings of the control interface.

Further, existing test technology is not compatible with simulation software and therefore cannot receive predetermined routes based on simulation routes. Accordingly, to validate a simulated test, the same test is programmed for the test technology. Further the existing test technology can not be remotely controlled or activated using the SDS (or onboard computer). For example, the SDS cannot activate a remote object to initiate a test procedure based on the relative position between the host vehicle and the remote object, instead the existing technology requires manual control or activation.

According to some aspects, the test rover apparatus includes a suspension system to withstand a vehicle drive-over event. The test rover apparatus also communicates with the SDS to receive a predetermined route that is based on simulation routes. Further, the test rover apparatus communicates directly with the SDS to receive routes and timing information. The test rover apparatus also automatically uploads, or logs, the test data when the test is completed.

With reference to FIG. 1, a test rover apparatus for testing one or more sensors or systems of a self-driving vehicle is illustrated in accordance with aspects of the disclosure and is generally referenced by numeral 100. The test rover apparatus 100 communicates with a vehicle system, such as a self-driving system (SDS) 102 of a vehicle 104, such as a self-driving vehicle. The SDS 102 includes a plurality of optical sensors 106 that monitor a field-of-view (FoV) around the vehicle 104. For example, FIG. 1 illustrates the test rover apparatus 100 within a FoV 108 of a sensor 106 that is mounted on top of the vehicle 104. The test rover apparatus 100 supports an object 110 that represents an actor, such as a car, a motorcycle, or a pedestrian (as shown in FIG. 1). The test rover apparatus 100 may be remotely controlled, or programmed, to perform test scenarios. For example, FIG. 1 illustrates an object 110 that represents a pedestrian and is supported by the test rover apparatus 100. The test rover apparatus 100 is controlled to perform a mission or maneuver that simulates a pedestrian crossing a street within a crosswalk as the vehicle 104 approaches the crosswalk.

The SDS 102 includes multiple sensor assemblies to collectively monitor a 360-degree FoV around the vehicle 104 in the near-field and the far-field. The SDS 102 includes a top sensor assembly 112, two side sensor assemblies 114, two front sensor assemblies 116, and a rear sensor assembly 118, according to aspects of the disclosure. Each sensor assembly includes one or more optical sensors 106, such as a camera, a lidar sensor, and a radar sensor.

The top sensor assembly 112 is mounted to a roof of the vehicle 104 and includes multiple optical sensors 106, such as one or more lidar sensors and cameras. The lidar sensor rotates about an axis to scan a 360-degree FoV about the vehicle 104. The side sensor assemblies 114 are mounted to a side of the vehicle 104, for example, to a front fender as shown in FIG. 1, or within a side-view mirror. Each side sensor assembly 114 includes multiple optical sensors 106, such as, a lidar sensor and a camera to monitor a FoV adjacent to the vehicle 104 in the near-field. The front sensor assemblies 116 are mounted to a front of the vehicle 104, such as, below the headlights. Each front sensor assembly 116 includes multiple optical sensors 106, for example, a lidar sensor, a radar sensor, and a camera to monitor a FoV in front of the vehicle 104 in the far-field. The rear sensor assembly 118 is mounted to an upper rear portion of the vehicle 104, such as adjacent to a Center High Mount Stop Lamp (CHMSL). The rear sensor assembly 118 also includes multiple optical sensors 106, such as a camera and a lidar sensor for monitoring the FoV behind the vehicle 104.

Figure 2:
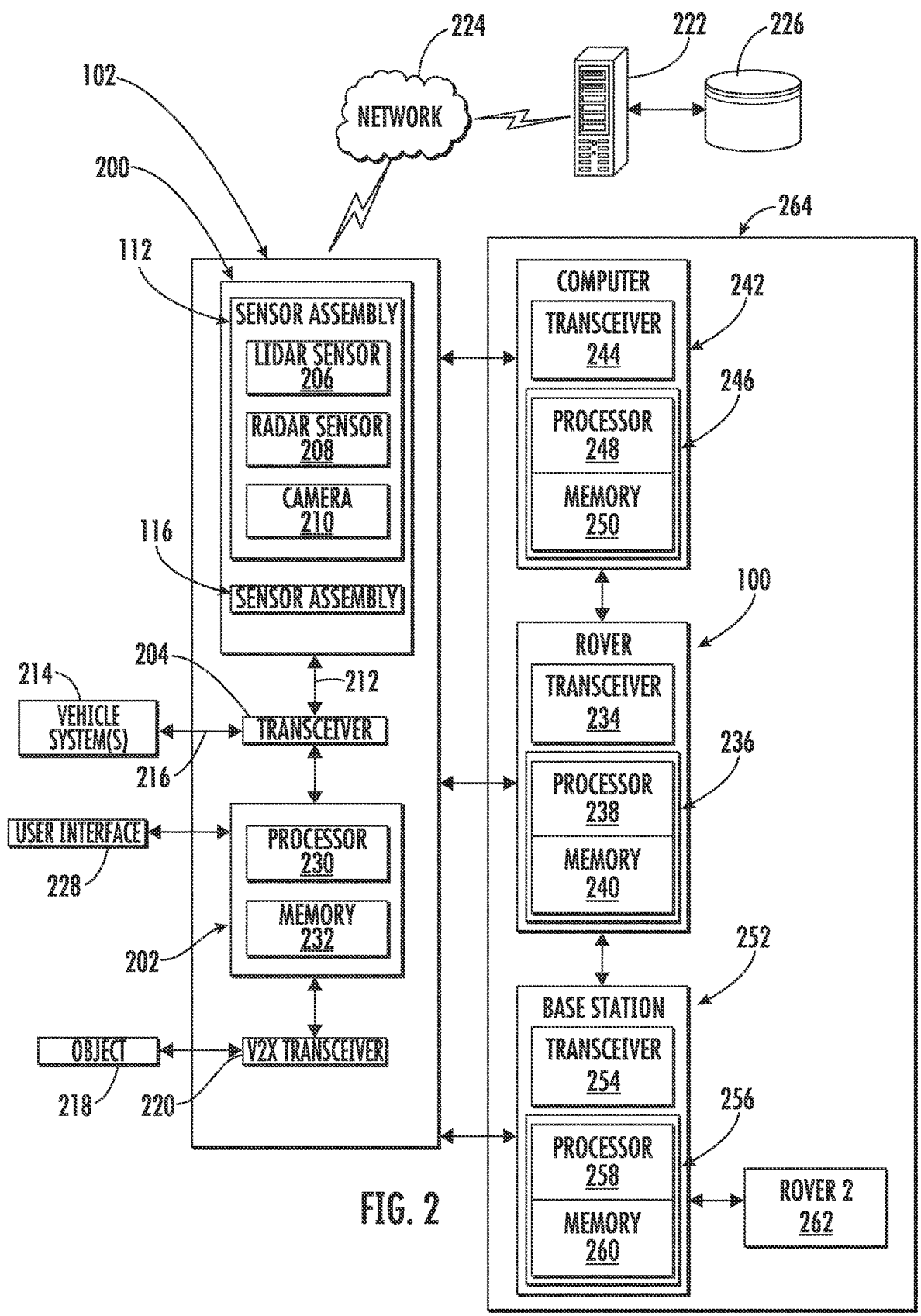
FIG. 2 is a schematic diagram illustrating communication between the SDS and other systems and devices, including the test rover apparatus, in accordance with aspects of the disclosure.

FIG. 2 illustrates communication between the SDS 102 and other systems and devices, e.g., the test rover apparatus 100, according to aspects of the disclosure. The SDS 102 includes a sensor system 200 and a controller 202. The controller 202 may communicate with other systems and devices by wired or wireless communication through a transceiver 204. The controller 202 communicates with the test rover apparatus 100 to provide test information, such as route, speed, and timing information.

The sensor system 200 includes the sensor assemblies, such as the top sensor assembly 112 and the front sensor assembly 116. The top sensor assembly 112 includes one or more sensors, e.g., a lidar sensor 206, a radar sensor 208, and a camera 210. The camera 210 may be a visible spectrum camera, an infrared camera, etc., according to aspects of the disclosure. The sensor system 200 may include additional sensors, such as a microphone, a sound navigation and ranging (SONAR) sensor, temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor system 200 provides sensor data 212 that is indicative of the external environment of the vehicle 104. The controller 202 analyzes the sensor data to identify and determine the location of external objects relative to the vehicle 104, e.g., the location of traffic lights, remote vehicles, pedestrians, the test rover apparatus 100, etc.

The SDS 102 also communicates with one or more vehicle systems 214 through the transceiver 204, such as an engine, a transmission, a navigation system, and a braking system. The controller 202 may receive information from the vehicle systems 214 that is indicative of present operating conditions of the vehicle 104, such as vehicle speed, engine speed, turn signal status, brake position, vehicle position, steering angle, and ambient temperature. The controller 202 may also control one or more of the vehicle systems 214 based on the sensor data 212, for example, the controller 202 may control a braking system and a steering system to avoid an obstacle. The controller 202 may communicate directly with the vehicle systems 214 or communicate indirectly with the vehicle systems 214 over a vehicle communication bus, such as a CAN bus 216.

The SDS 102 may also communicate with external objects 218, such as remote vehicles and structures, to share the external environment information and/or to collect additional external environment information. The SDS 102 may include a vehicle-to-everything (V2X) transceiver 220 that is connected to the controller 202 for communicating with the objects 218. For example, the SDS 102 may use the V2X transceiver 220 for communicating directly with: a remote vehicle by vehicle-to-vehicle (V2V) communication, a structure (e.g., a sign, a building, or a traffic light) by vehicle-to-infrastructure (V2I) communication, and a motorcycle by vehicle-to-motorcycle (V2M) communication. Each V2X device may provide information indictive of its own status, or the status of another V2X device.

The SDS 102 may communicate with a remote computing device 222 over a communications network 224 using one or more of the transceivers 204, 220. For example, the SDS 102 may provide data to the remote computing device 222 that is indicative of a message or visual that indicates the location of the objects 218 relative to the vehicle 104, based on the sensor data 212. The remote computing device 222 may include one or more servers to process one or more processes of the technology described herein. The remote computing device 222 may also communicate data with a database 226 over the network 224.

The SDS 102 also communicates with a user interface 228 to provide information to a user of the vehicle 104. The controller 202 may control the user interface 228 to provide a message or visual that indicates the location of the objects 218, or the test rover apparatus 100, relative to the vehicle 104, based on the sensor data 212.

Although the controller 202 is described as a single controller, it may contain multiple controllers, or may be embodied as software code within one or more other controllers. The controller 202 includes a processing unit, or processor 230, that may include any number of microprocessors, ASICs, ICs, memory (e.g., FLASH, ROM, RAM, EPROM and/or EEPROM) and software code to co-act with one another to perform a series of operations. Such hardware and/or software may be grouped together in assemblies to perform certain functions. Any one or more of the controllers or devices described herein include computer executable instructions that may be compiled or interpreted from computer programs created using a variety of programming languages and/or technologies. The controller 202 also includes memory 232, or non-transitory computer-readable storage medium, that is capable of executing instructions of a software program. The memory 232 may be, but is not limited to, an electronic storage device, a magnetic storage device, an optical storage device, an electromagnetic storage device, a semi-conductor storage device, or any suitable combination thereof. In general, the processor 230 receives instructions, for example from the memory 232, a computer-readable medium, or the like, and executes the instructions. The controller 202, also includes predetermined data, or "look up tables" that is stored within memory, according to aspects of the disclosure.

The SDS 102 may communicate directly with the test rover apparatus 100, for example, to provide route, speed, and timing information. The test rover apparatus 100 includes a transceiver 234 for communicating with other devices by wireless communication, such as radio frequency, Wi-Fi, and Bluetooth communication. The test rover apparatus 100 also includes a controller 236, including a processor 238 and memory 240. The SDS 102 may communicate indirectly with the test rover apparatus 100 through a computer 242, such as a laptop computer within the vehicle 104. The computer 242 may provide the route and timing information to the test rover apparatus 100. The computer 242 includes a transceiver 244 and a controller 246, including a processor 248 and memory 250.

According to aspects of the disclosure, the computer 242 may be configured to communicate with both the SDS 102 and the test rover apparatus 100 to generate missions from simulation data or a simulation graphical user interface (GUI). The simulation data may include a simulated environment and a model of one or more mobile actors performing maneuvers within the simulated environment. This allows the computer 242 to execute a relevant subset of simulation scenarios in a physical test on a test track. Simulation testing may be used to test the response of the SDS software to simulated inputs. For example, simulation testing may be used to verify motion planning and parts of motion control and prediction software. However, such simulation testing does not typically use the actual SDS sensors to monitor remote objects, and therefore does not verify such hardware. Physical testing may be used to test the entire SDS 102, i.e., the whole stack end-to-end, including the sensor system 200 and software. A physical test that is derived from a simulated test may be used to validate the simulation. However, physical testing may be inefficient due to coordination with other systems and actors. Further, such testing may result in damage to the other systems and actors. Using the simulation software, instead of existing technology with its own software, improves testing efficiency by eliminating the redundancy of writing a program to control a test apparatus to perform like an actor in a simulation. Thus a test scenario may be generated once, and can then be executed in simulation or to control the test rover apparatus 100 in a physical test on the test track.

The SDS 102 may also communicate indirectly with the test rover apparatus 100 through a base station 252. The base station 252 includes a transceiver 254 and a controller 256, including a processor 258 and memory 260. The base station 252 may be used to coordinate testing between the SDS 102 and multiple test rovers, such as the test rover apparatus 100 and a second test rover apparatus 262. The base station 252 may also coordinate testing between multiple vehicles, such as the vehicle 104 and a second vehicle (not shown), and one or more test rover apparatuses 100, 262. For example, the base station 252 may automatically push mission data and parameters to each test rover apparatus 100, 262. This coordination by the base station 252 makes it easier to reproduce tests and makes it possible to scale up the operation to include more: missions, test rover apparatuses, operators, and concurrent test executions, and reduce the amount of manual work by introducing more automation. The test rover apparatus 100, the computer 242, and the base station 252 may be collectively referred to as a test system 264.

Figure 3:
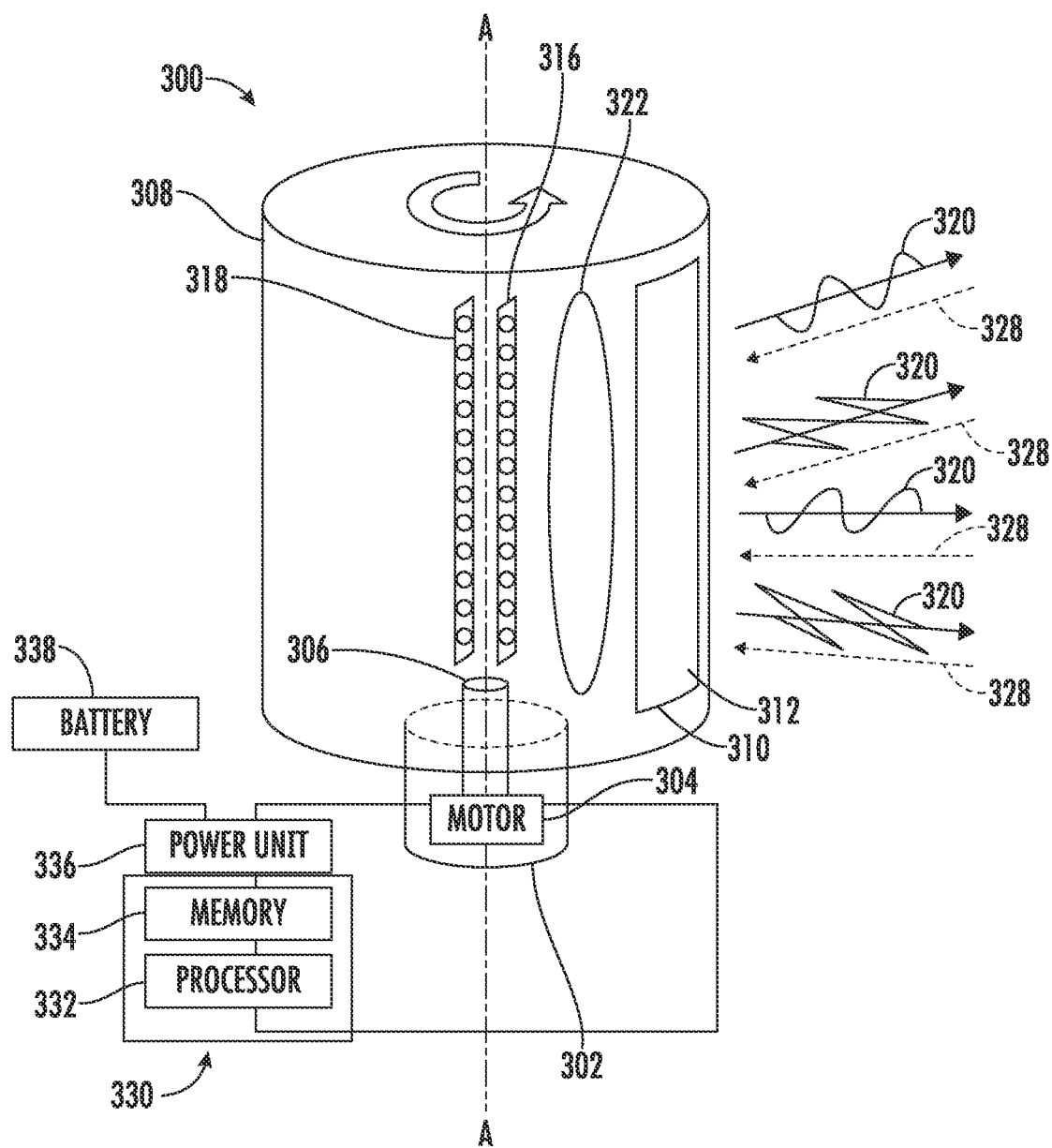
FIG. 3 is an exemplary architecture of a lidar sensor of the SDS, in accordance with aspects of the disclosure.

FIG. 3 illustrates an exemplary architecture of a lidar sensor 300, such as the lidar sensor 206 of the top sensor assembly 112, according to aspects of the disclosure. The lidar sensor 300 includes a base 302 that is mounted to the vehicle 104. The base 302 includes a motor 304 with a shaft 306 that extends along an axis A-A. The lidar sensor 300 also includes a housing 308 that is secured to the shaft 306 and mounted for rotation relative to the base 302 about Axis A-A. The housing 308 includes an opening 310 and a cover 312 that is secured within the opening 310. The cover 312 is formed of a material that is transparent to light, such as glass. Although a single cover 312 is shown in FIG. 3, the lidar sensor 300 may include multiple covers, or a cover that spans the entire outer surface of the housing 308 (not shown).

The lidar sensor 300 includes one or more emitters 316 for transmitting light pulses 320 through the cover 312 and away from the vehicle 104. The light pulses 320 are incident on one or more objects and reflect back toward the lidar sensor 300 as reflected light pulses 328. The lidar sensor 300 also includes one or more light detectors 318 for receiving the reflected light pulses 328 that pass through the cover 312. The detectors 318 also receive light from external light sources, such as the sun. The lidar sensor 300 rotates about Axis A-A to scan the region within its FoV. The lidar sensor 300 may rotate 360 degrees about the axis. The emitters 316 and the detectors 318 may be stationary, e.g., mounted to the base 302, or dynamic and mounted to the housing 308.

The emitters 316 may include laser emitter chips or other light emitting devices and may include any number of individual emitters (e.g., 8 emitters, 64 emitters, or 128 emitters). The emitters 316 may transmit light pulses 320 of substantially the same intensity or of varying intensities, and in various waveforms, e.g., sinusoidal, square-wave, and sawtooth. The lidar sensor 300 may include one or more optical elements 322 to focus and direct light that is passed through the cover 312.

The detectors 318 may include a photodetector, or an array of photodetectors, that is positioned to receive the reflected light pulses 328. According to aspects of the disclosure, the detectors 318 include a plurality of pixels, wherein each pixel includes a Geiger-mode avalanche photodiode, for detecting reflections of the light pulses during each of a plurality of detection frames. In other embodiments, the detectors 318 include passive imagers.

The lidar sensor 300 includes a controller 330 with a processor 332 and memory 334 to control various components, e.g., the motor 304, the emitters 316, and the detectors 318. The controller 330 also analyzes the data collected by the detectors 318, to measure characteristics of the light received, and generates information about the environment external to the vehicle 104. The controller 330 may be integrated with another controller, such as the controller 202 of the SDS 102. The lidar sensor 300 also includes a power unit 336 that receives electrical power from a vehicle battery 338, and supplies the electrical power to the motor 304, the emitters 316, the detectors 318, and the controller 330.

Figure 4:
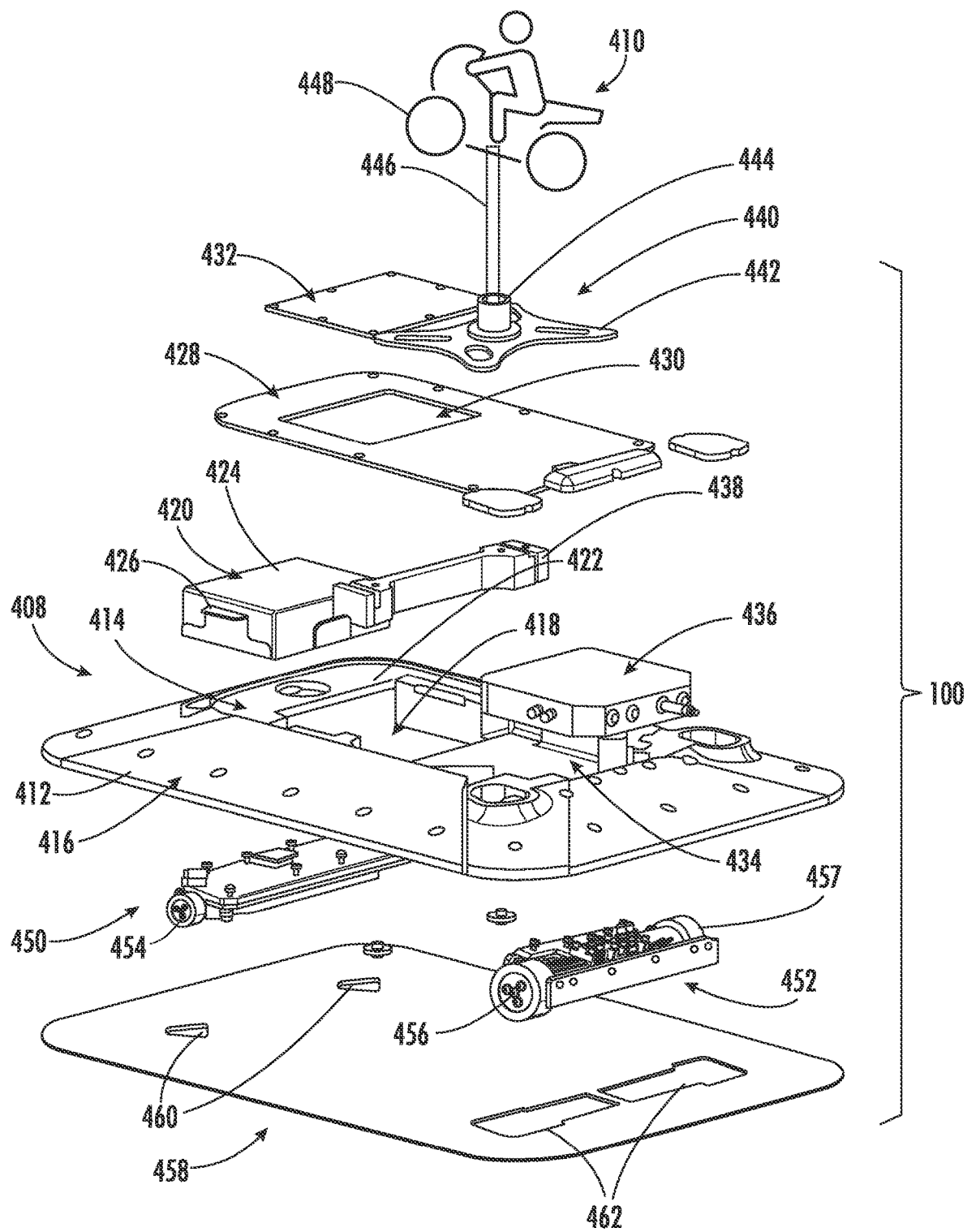
FIG. 4 is an exploded view of the test rover apparatus, in accordance with aspects of the disclosure.

With reference to FIG. 4, the test rover apparatus 100 includes a chassis 408 for supporting an object 410 that represents a mobile actor, such as a motorcycle. The chassis 408 is formed with a base 412, a top end 414, and a sidewall 416 that extends from the base 412 to the top end 414 to define a cavity 418. The sidewall 416 may be formed with rounded corners and tapered inward as it extends from the base 412 to provide a low-profile ramp for a vehicle, such as the vehicle 104 of FIG. 1, to drive over it.

The test rover apparatus 100 includes a battery 420 that is supported by the chassis 408. The battery 420 is a lithium-ion battery that provides 700-800 Watt-hours, according to aspects of the disclosure. The top end 414 of the chassis 408 is formed with an aperture 422 to receive the battery 420. The battery 420 includes a housing 424 with flanges 426 that extend outward from the housing 424 to engage the top end 414 of the chassis 408 about the aperture 422 to locate the battery 420 within the cavity 418. The test rover apparatus 100 includes a top plate 428 that mounts to the top end 414 of the chassis 408 to secure the battery 420 within the cavity 418. The top plate 428 may include an opening 430 that is aligned with the battery 420. The test rover apparatus 100 may also include a cover 432 that is attached to the top plate 428 over the opening 430, for example with fasteners, to enclose the battery 420. The cover 432 may be detached from the top plate 428 to provide access for charging and/or replacement of the battery 420.

The top end 414 of the chassis 408 forms a recess 434 to receive the controller 236, according to aspects of the disclosure. As described with reference to FIG. 2, the controller 236 communicates with the SDS 102, the computer 242, and/or the base station 252 to receive route, speed, and timing information or instructions. The controller 236 includes a processor 238 and memory 240 to control the test rover apparatus 100 based on these instructions. The controller 436 may also record test data in the memory 240 and communicate this data to one or more other devices in real-time, or after the test is completed using the transceiver 234. The top plate 428 may extend over the controller 436 to enclose the controller 436 within the recess 434. The test rover apparatus 100 may also include a spacer 438 that is mounted within the recess 434 to separate the controller 436 from the battery 420 and provide structural rigidity for the chassis 408.

The test rover apparatus 100 includes a coupling 440 for mounting the object 410 to the chassis 408. The coupling 440 includes a base 442 for mounting to the top plate 428. The coupling 440 also includes a receptacle 444 that extends from base 442. The object 410 includes a post 446 and a body 448 that is secured to the post 446 and formed in a shape that resembles a movable actor, such as a motorcycle. The receptacle 444 of the coupling 440 receives the post 446 to mount the object 410 to the chassis 408. The test rover apparatus 100 may include one or more fasteners (not shown) to retain the post 446 within the receptacle 444. The chassis 408 supports a maximum payload of approximately 25 pounds (lbs) (11.3 Kg) to accommodate objects that represent different actors, such as the pedestrian object 110 illustrated in FIG. 1 that weighs approximately 12 lbs, and the motorcycle object 410 illustrated in FIG. 4, that weighs approximately 25 lbs, according to aspects of the disclosure.

The test rover apparatus 100 includes a front assembly 450 and a rear assembly 452 that are both mounted to the chassis 408 within the cavity 418. The front assembly 450 includes a front left wheel 454 and a front right wheel 455, and the rear assembly 452 includes a rear left wheel 456 and a rear right wheel 457, according to aspects of the disclosure. The test rover apparatus 100 includes a bottom plate 458 that is mounted to the base 412 of the chassis 408 to partially enclose the front assembly 450 and the rear assembly 452 within the cavity 418. The bottom plate 458 includes front apertures 460 and rear apertures 462. The front wheels 454, 455 extend through the front apertures 460, and the rear wheels 456, 457 extend through the rear apertures 462.

Figure 5:
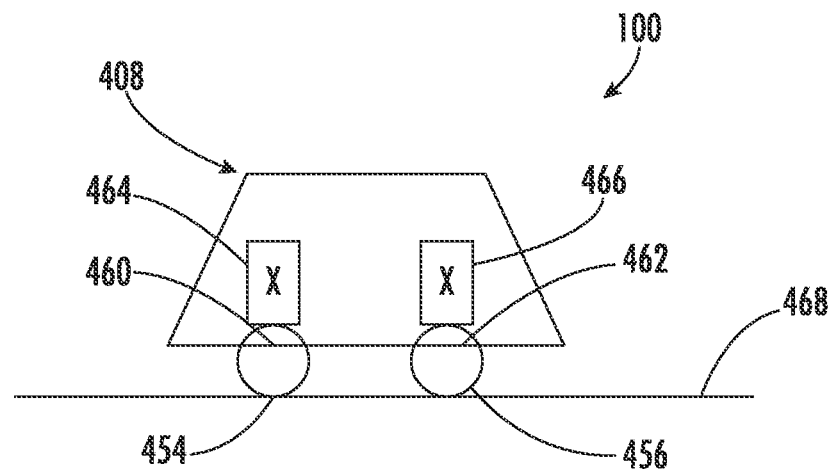
FIG. 5 is a side view of the test rover apparatus in an unloaded condition, in accordance with aspects of the disclosure.
Figure 6:
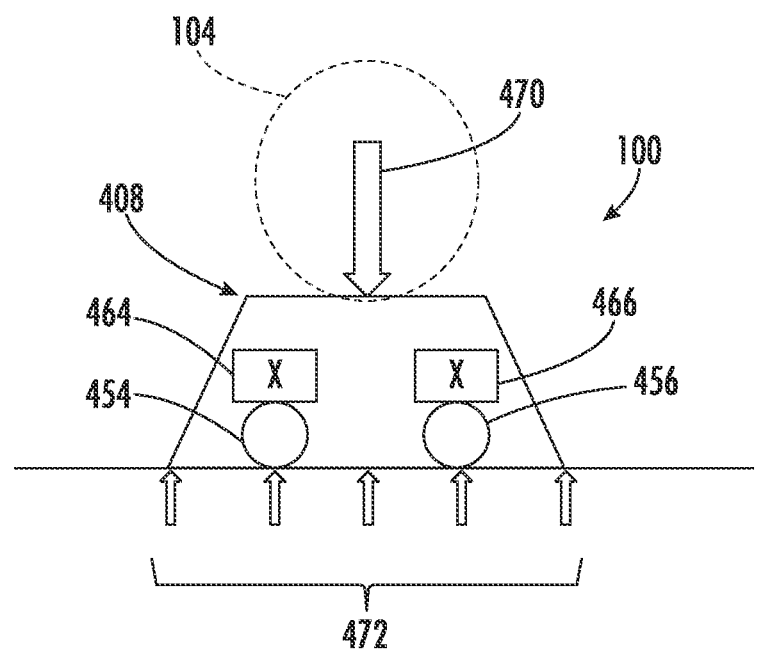
FIG. 6 is a side schematic view of the test rover apparatus in a loaded condition, in accordance with aspects of the disclosure.

Referring to FIGS. 5 and 6, the test rover apparatus 100 includes a front suspension system 464 and a rear suspension system 466. The front wheels 454, 456 extend through the front apertures 460 to engage an underlying surface 468, and the rear wheels 456, 457 extend through the rear apertures 462 to engage the underlying surface 468. During vehicle testing, the vehicle 104 may contact the test rover apparatus 100, for example, if the automatic braking system is disabled. The test rover apparatus 100 provides a low-profile ramp for the vehicle 104 to drive over it. During such a drive-over event, the front suspension system 464 and/or the rear suspension system 466 compresses to allow the front wheels 454, 455 and the rear wheels 456, 457 to retract within the chassis 408 such that the load of the vehicle 104, which is represented by arrow 470, results in a reactionary force distributed about the bottom plate 458, which is represented by arrows 472, to limit damage to the front assembly 450 and the rear assembly 452. The front suspension system 464 and the rear suspension system 466 are designed to withstand approximately 40 lbs at each wheel, or 150 lbf at the center of the chassis, before compressing to allow the bottom plate 458 to contact the underlying surface 468. The test apparatus 100 may withstand a load 470 of approximately 1000 lbs during a driver-over event, according to aspects of the disclosure.

Figure 7:
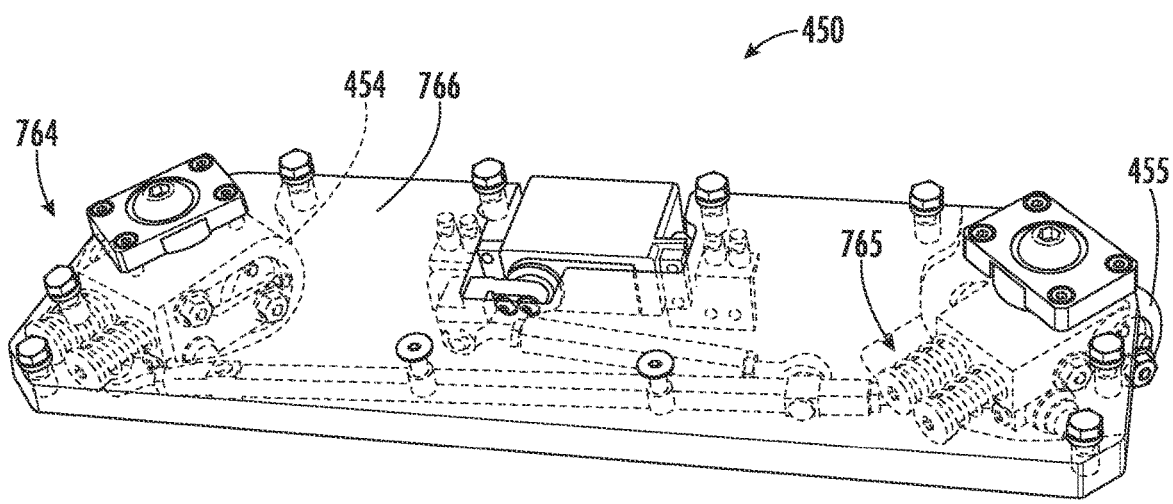
FIG. 7 is a top perspective view of a front assembly of the test rover apparatus, illustrating a front suspension system and a front steering system, in accordance with aspects of the disclosure.

FIG. 7 illustrates the front assembly 450 with a front left wheel 454 and a front right wheel 455. The front assembly 450 includes a front left suspension system 764 for the front left wheel 454 and a front right suspension system 765 for the front right wheel 455. The front assembly 450 also includes a frame 766 for mounting to a front portion of the top end 414 of the chassis 408.

Figure 8:
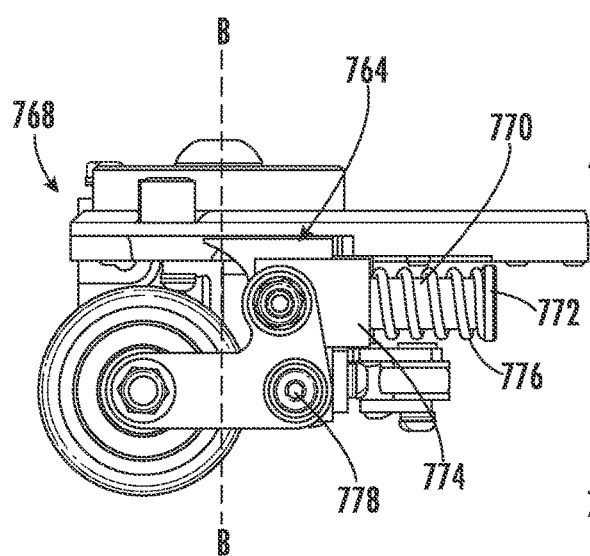
FIG. 8 is a side view of the front suspension system, illustrated in the unloaded condition, in accordance with aspects of the disclosure.
Figure 9:
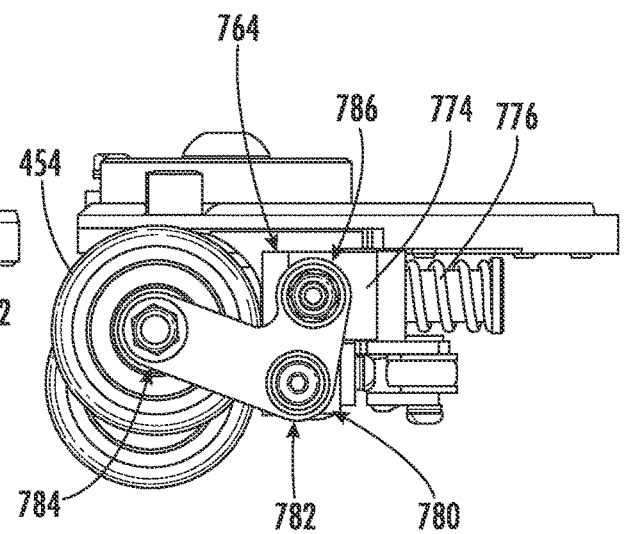
FIG. 9 is another side view of the front suspension system, illustrated in the loaded condition, in accordance with aspects of the disclosure.

Referring to FIGS. 8 and 9, the front left suspension system 764 includes a knuckle 768 that is mounted for rotation about a vertical axis, Axis B-B, relative to the frame 766. The front left suspension system 764 also includes two posts 770 that extend from the knuckle 768. Each post 770 includes a seat 772 formed at an end. The front left suspension system 764 also includes a coupling 774 that is mounted for translation along the posts 770. The front left suspension system 764 also includes two springs 776. Each spring 776 is disposed on a post 770 between the coupling 774 and the seat 772 to spring bias the coupling 774 toward the knuckle 768. The knuckle 768 supports a pivot shaft 778 that extends along a horizontal axis.

The front left suspension system 764 includes a pair of linkages 780 that are pivotally connected to opposing sides of the knuckle 768. Each linkage 780 includes a central region 782 that is pivotally connected to the pivot shaft 778. Each linkage 780 also includes a distal end 784 that is connected to an axle of the front left wheel 454 by a revolute joint, and a proximal end 786 that is connected to the coupling 774 by a prismatic joint. The springs 776 bias the front left wheel 454, through the coupling 774 and linkages 780, downward to engage the ground, as illustrated in the unloaded condition of FIG. 8. When a load is applied to the top of the chassis 408, for example, when the vehicle 104 drives over the test rover apparatus 100, the reactionary force drives the front left wheel 454 upward against the spring force, as depicted in FIG. 9. The front right suspension system 765 includes similar components and functionality as the front left suspension system 764.

Figure 10:
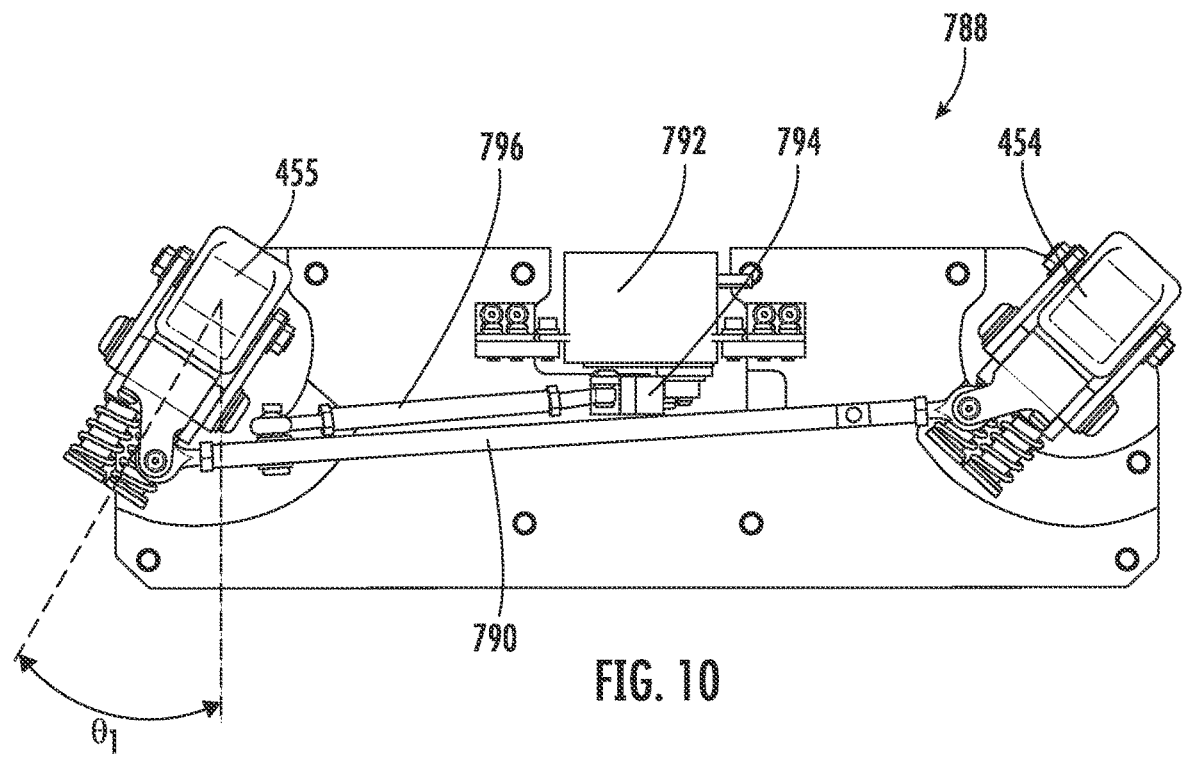
FIG. 10 is a bottom view of the front steering system, illustrated adjusted to a full left turn position, in accordance with aspects of the disclosure.
Figure 11:
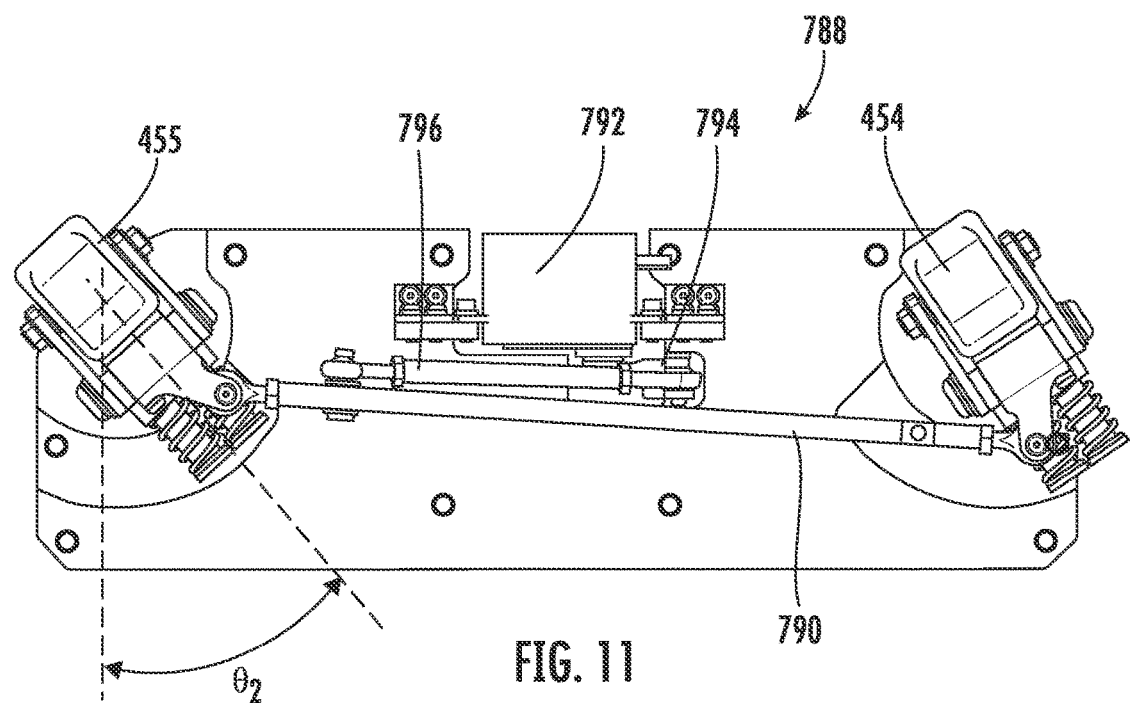
FIG. 11 is another bottom view of the front steering system, illustrated adjusted to a full right turn position, in accordance with aspects of the disclosure.

Referring to FIGS. 10 and 11, the front assembly 450 includes a steering system 788 to steer the front left wheel 454 and the front right wheel 455 in unison. Each wheel 454, 455 is mounted for rotation about a vertical axis, for example, the front left wheel 454 is mounted for rotation about Axis B-B, as shown in FIG. 8. The steering system 788 includes a tie rod 790 that is connected between the knuckle of each wheel 454, 455. The steering system 788 also includes an actuator 792 that drives an output crank 794 back and forth along a predetermined angular travel. The steering system 788 also includes a connecting rod 796 that connects the output crank 794 to the tie rod 790. The steering system 788 functions as a rocker-slider mechanism, whereby the actuator 792 drives the output crank 794 to rock back and forth, which causes the tie rod to translate, or slide, which causes the wheels 454, 455 to adjust to a steering angle within a predetermined angular travel range. The angular travel range may be between 60-90 degrees, according to aspects of the disclosure. In one example embodiment, the total angular travel range is 84.4 degrees; FIG. 10 illustrates the front right wheel 455 adjusted to a minimum steering angle $\theta_1$ of −42.2 degrees, and FIG. 11 illustrates the front right wheel 455 adjusted to a maximum steering angle $\theta_2$ of 42.2 degrees.

Figure 12:
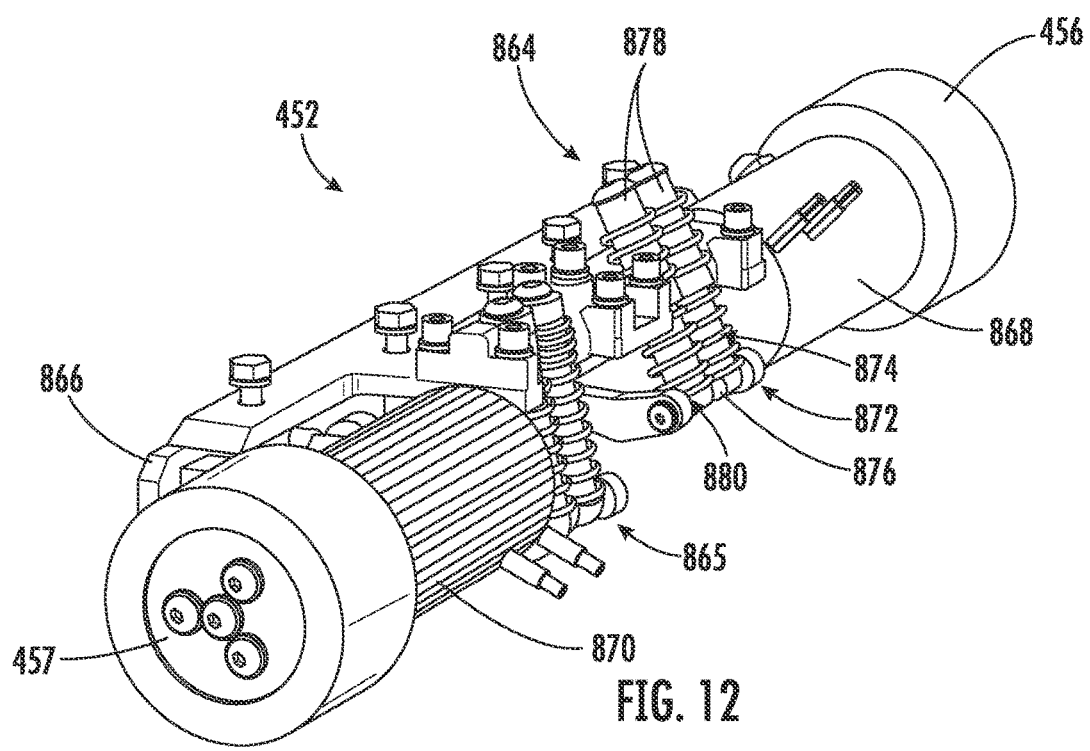
FIG. 12 is a top perspective view of a rear assembly of the test rover apparatus, illustrating a rear suspension system, in accordance with aspects of the disclosure.

FIG. 12 illustrates the rear assembly 452 with a rear left wheel 456 and a rear right wheel 457. The rear assembly 452 includes a rear left suspension system 864 for the rear left wheel 456 and a rear right suspension system 865 for the rear right wheel 457. The rear assembly 452 includes a frame 866 for mounting to a rear portion of the top end 414 of the chassis 408. The rear assembly 452 includes a pair of electric motors, including a left motor 868 and a right motor 870, that are each connected to a corresponding wheel 456 or 457.

Figure 13:
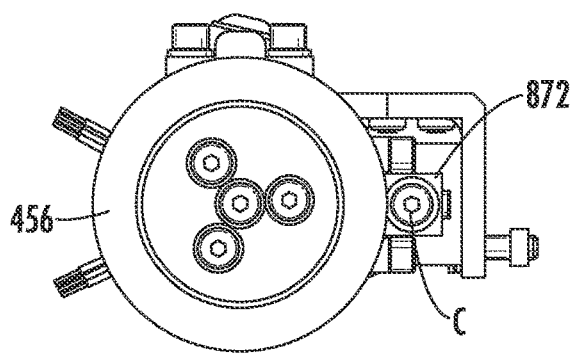
FIG. 13 is a side view of the rear suspension system, illustrated in the unloaded condition, in accordance with aspects of the disclosure.
Figure 14:
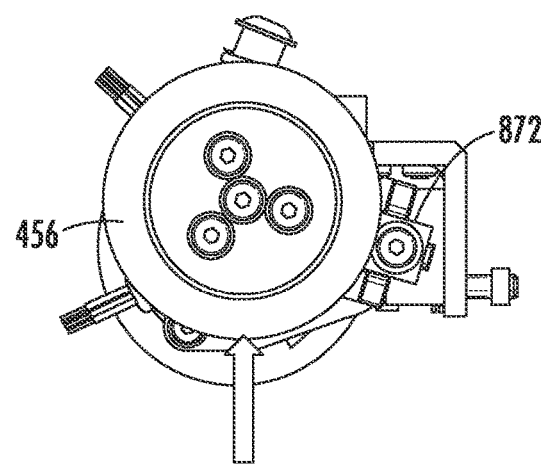
FIG. 14 is another side view of the rear suspension system, illustrated in the loaded condition, in accordance with aspects of the disclosure.

Referring to FIGS. 12-14, the rear left suspension system 864 includes a bracket 872 that is pivotally connected to the frame 866 about horizontal Axis C-C. The bracket 872 supports the left motor 868. The rear left suspension system 864 also includes two posts 874 that each include a proximal end 876 that is pivotally connected to the bracket 872. Each post 874 extends through a collar 878 that is fixed to the frame 866. The rear left suspension system 864 also includes two springs 880. Each spring 880 is disposed on a post 874 between the proximal end 876 and the collar 878 to spring bias the bracket 872, along with the left motor 868 and the left wheel 456, downward to engage the ground, as illustrated in the unloaded condition of FIG. 13. When a load is applied to the top of the chassis 408, for example, when the vehicle 104 drives over the test rover apparatus 100, the reactionary force drives the rear left wheel 456 upward against the spring force, as depicted in FIG. 14. The rear right suspension system 865 includes similar components and functionality as the rear left suspension system 864.

The test apparatus 100 emulates the motion of multiple actor types. For example, the electric motors 868, 870 collectively provide a speed range of 0 to approximately 30 miles-per-hour (mph) which allows the apparatus 100 to emulate a slow-moving pedestrian and a fast-moving motorcycle.

With reference to FIGS. 15A-17D, the test rover apparatus 100 may be controlled to represent an actor, such as a pedestrian, within a real-world vehicle test. The test evaluates the response of an SDS to a pedestrian crossing a crosswalk in front of a vehicle under test, that includes the SDS, such as the vehicle 104 with the SDS 102.

Figure 15A:
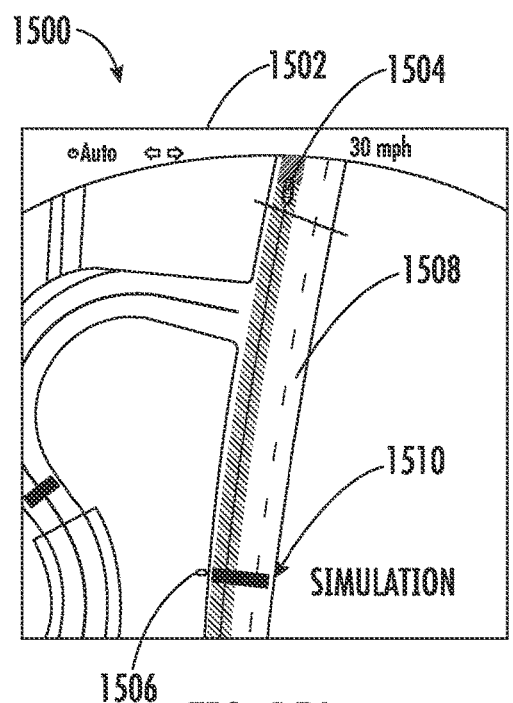
FIG. 15A is a diagram illustrating a first position of a simulated test, in accordance with aspects of the disclosure.
Figure 15B:
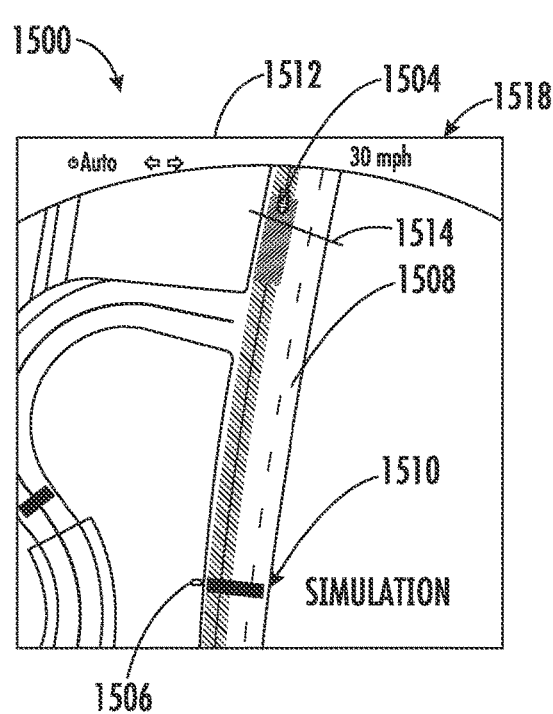
FIG. 15B is a diagram illustrating a second position of the simulated test, in accordance with aspects of the disclosure.
Figure 15C:
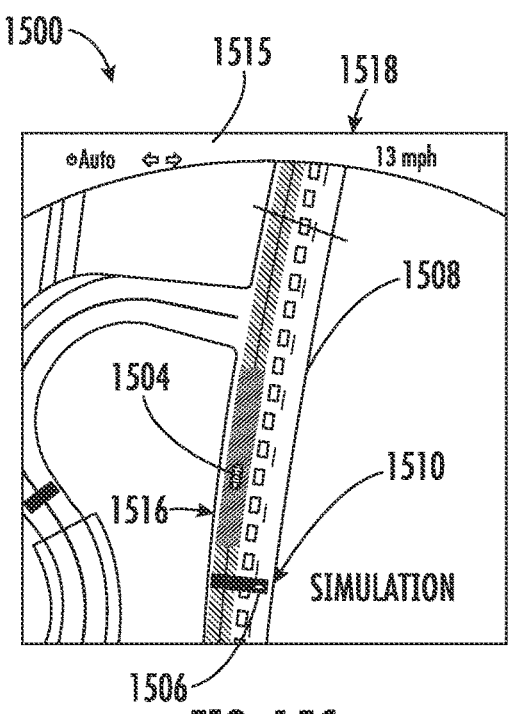
FIG. 15C is a diagram illustrating a third position of the simulated test, in accordance with aspects of the disclosure.

FIGS. 15A-15C illustrate a simulation graphical user interface 1500 of the test, without the test rover apparatus 100. FIG. 15A illustrates a first position 1502 in which a vehicle 1504 approaches a pedestrian 1506 on the side of a road 1508 and adjacent to a crosswalk 1510. FIG. 15B illustrates a second position 1512 in which the pedestrian 1506 starts crossing the road 1508 within the crosswalk 1510. The pedestrian 1506 may be activated when the vehicle 1504 reaches a predetermined waypoint 1514. FIG. 15C illustrates a third position 1515 in which, after detecting the pedestrian 1506 in the crosswalk 1510, the SDS decelerates the vehicle 1504 within a deceleration zone 1516 as it approaches the crosswalk 1510, as indicated by a speedometer display 1518 illustrating a vehicle speed of 30 miles-per-hour (mph) at the second position 1512 reducing to 13 mph in the third position 1515.

Referring back to FIG. 2, the simulation may run in the cloud for testing the vehicle 104 in a lab. Alternatively, the simulation may run on a computer 242 that is located within the vehicle 104. The simulation may be used to simulate mobile actors, such as the pedestrian, by supplying input to the SDS 102 while the vehicle 104 is traveling in real-world conditions, to validate the SDS response. However such an approach does not use the sensor system 200. Accordingly, the computer 242 may run the simulation and send route and timing information to the test rover apparatus 100 to perform a maneuver or mission that is derived from the simulation, which may be used to perform a real-world or physical test to validate one or more components of the sensor system 200.

FIG. 16A-17D illustrate multiple views and images of the physical test derived from the simulation illustrated in FIGS. 15A-15C in which a vehicle 104 approaches a test rover apparatus 100 that represents a pedestrian on the side of a road 1608 and adjacent to the crosswalk 1610.

Figure 16A:
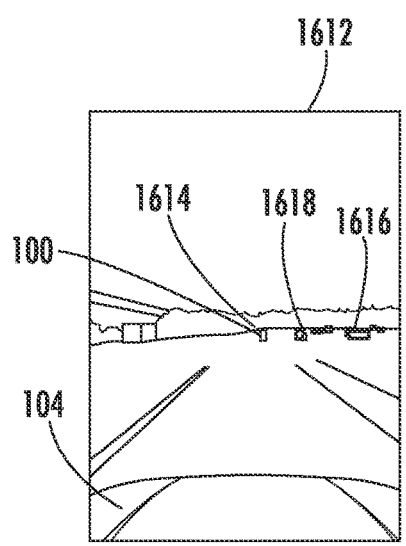
FIG. 16A is an image of a vehicle interface illustrating an environment external to a vehicle during a physical test derived from the simulated test and corresponding to the second position of FIG. 15B, in accordance with aspects of the disclosure.
Figure 16B:
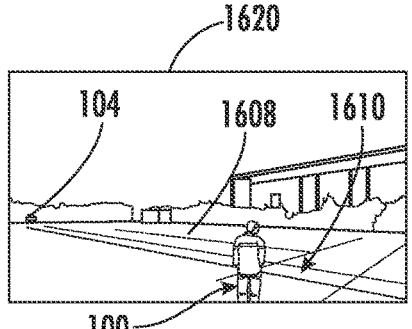
FIG. 16B is an image from an external camera illustrating the test rover apparatus as the vehicle approaches during the physical test derived from the simulated test and corresponding to the second position of FIG. 15B, in accordance with aspects of the disclosure.
Figure 16C:
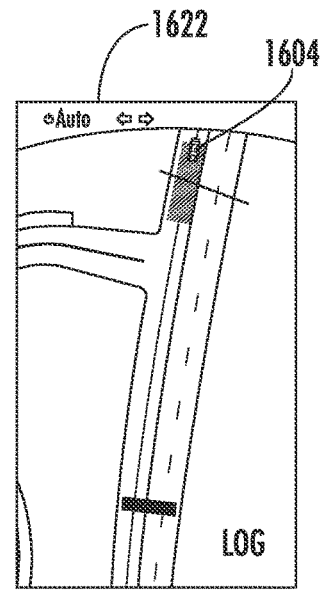
FIG. 16C is an image representing test data taken during the physical test derived from the simulated test and corresponding to the second position of FIG. 15B, in accordance with aspects of the disclosure.

FIGS. 16A-16C represent test data corresponding to the second position 1512 of the simulation illustrated in FIG. 15B. FIG. 15A depicts a user interface 1612, like the user interface 228 of FIG. 2, that represents a view from a vehicle 104 based on data from the sensor system 200, such as 2D image data from the camera 210 and 3D point cloud data from the lidar sensor 206. The SDS identifies objects in the external environment, and classifies them within different groups, e.g., pedestrian, vehicle, vegetation, signs, etc. Then the SDS generates a bounding box around objects of interest in the vehicle interface, and the bounding boxes may be of different shapes or color based on the classification of the object. For example, the SDS may generate pedestrian bounding boxes 1614 for pedestrians, vegetation bounding boxes 1616 for vegetation, and infrastructure bounding boxes 1618 for signs and streetlights. Here the SDS has identified the test rover apparatus 100 as a pedestrian and assigned the corresponding pedestrian bounding box 1614. FIG. 16B depicts an external image 1620 of the test taken by an external camera (not shown). The camera is positioned adjacent to the crosswalk 1610 to capture the vehicle 104 as it approaches the test rover apparatus 100. FIG. 16C depicts a test log image 1622 that represents the test data recorded, or logged, by the computer 242. The test log image 1622 illustrates a vehicle icon 1604 that represents the vehicle 104, but not the test rover apparatus 100 because the vehicle 104 is still far away. The test data may be compared to the simulation data at the corresponding position, i.e., the second position 1512 of FIG. 15B, to validate the SDS.

Figure 17A:
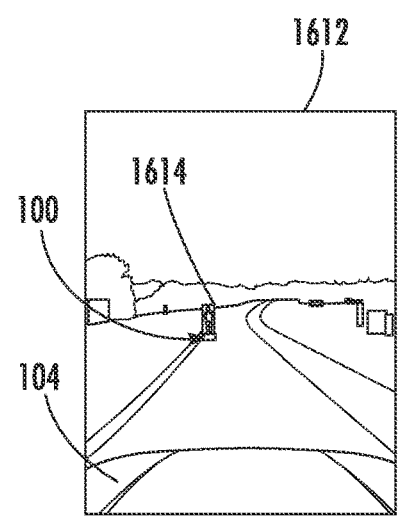
FIG. 17A is an image of the vehicle interface illustrating the environment external to the vehicle during the physical test derived from the simulated test and corresponding to the third position of FIG. 15C, in accordance with aspects of the disclosure.
Figure 17B:
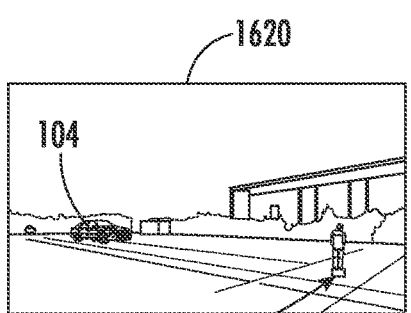
FIG. 17B is an image from the external camera illustrating the test rover apparatus as the vehicle approaches during the physical test derived from the simulated test and corresponding to the third position of FIG. 15C, in accordance with aspects of the disclosure.
Figure 17C:
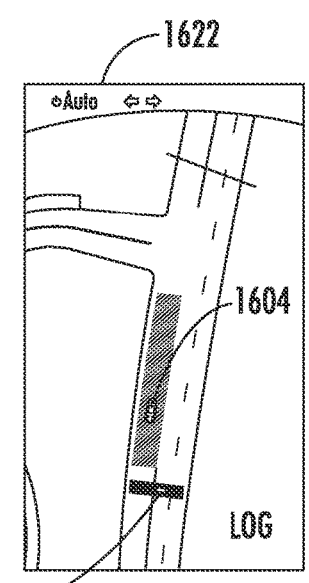
FIG. 17C is an image representing test data taken during the physical test derived from the simulated test and corresponding to the third position of FIG. 15C, in accordance with aspects of the disclosure.

FIGS. 17A-17D represent test data corresponding to the third position 1515 of the simulation illustrated in FIG. 15C. FIG. 17A depicts the user interface 1612 when the vehicle 104 is close to the test rover apparatus 100. FIG. 17B depicts the external image 1620 of the test taken by an external camera (not shown) when the test rover apparatus 100 is located in the crosswalk 1610 in the middle of the road 1608. FIG. 17C depicts the test log image 1622 that represents the test data recorded, or logged, by the computer 242. The test log image 1622 illustrates the vehicle icon 1604 and a test rover apparatus icon 1700 that represents the test rover apparatus 100. The test data may be compared to the simulation data at the corresponding position, i.e., the third position 1515 of FIG. 15C, to validate the SDS.

Figure 18:
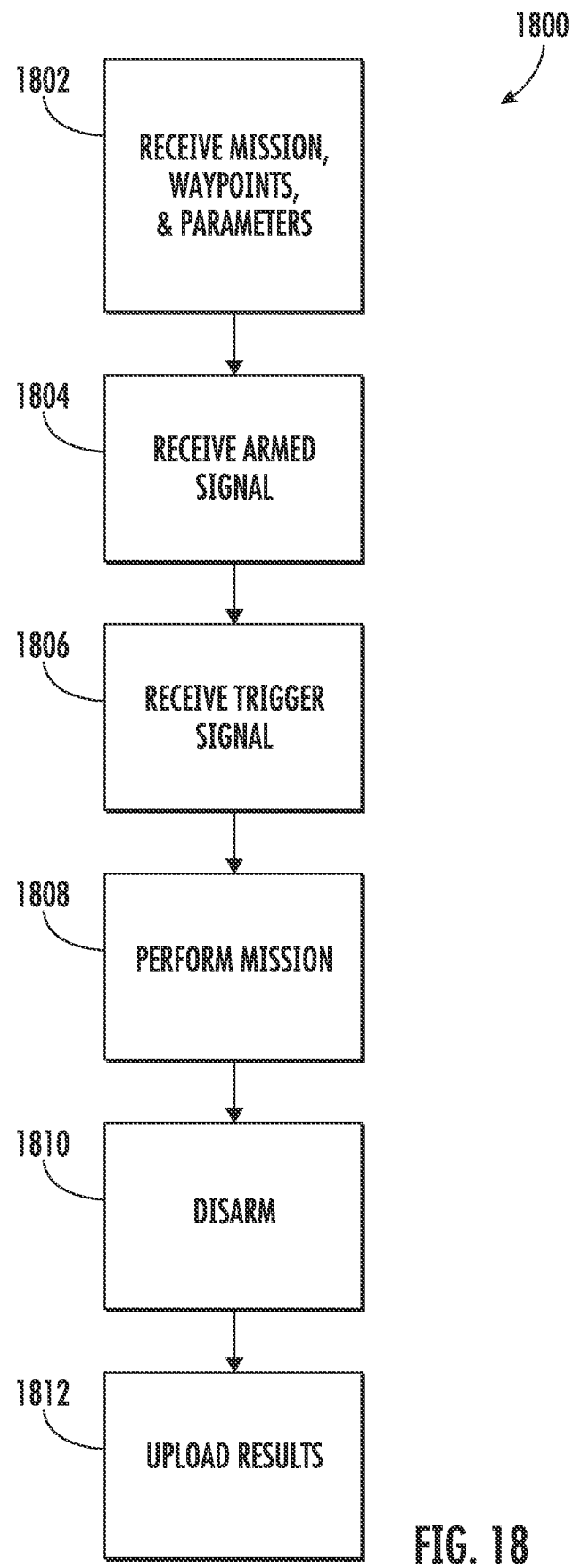
FIG. 18 is a flow chart illustrating a method for controlling the test rover apparatus, in accordance with aspects of the disclosure.

With reference to FIG. 18, a flow chart depicting a method for controlling a test rover apparatus is illustrated in accordance with one or more embodiments and is generally referenced by numeral 1800. The test rover apparatus 100 may be remotely controlled to execute pre-defined tests in an efficient and reproduceable manner. The method 1800 is implemented using software code that is executed by the processor 238 and contained within the memory 240 of the controller 236 of the test rover apparatus 100 according to aspects of the disclosure. Alternatively, the method 1800, or portions of the method 1800, may be implemented in one or more other controllers, such as the controller 202 of the SDS 102, the controller 256 of the base station 252, or the controller 246 of the computer 242. While the flowchart is illustrated with a number of sequential steps, one or more steps may be omitted and/or executed in another manner without deviating from the scope and contemplation of the present disclosure.

At step 1802 the controller 236 of the test rover apparatus 100 receives mission data. The computer 242 generates the mission data based on simulation data, according to aspects of the disclosure. The mission data represents a maneuver performed by an actor during a test, such as a pedestrian crossing a crosswalk, a vehicle turning into a driving lane, or a motorcycle passing a vehicle. The mission data may be saved in the memory 240 of the test rover apparatus 100, and may include waypoint and parameters for the test. For example, the waypoint information may be indicative of a starting position for the test. The parameters may include route information indicative of the route to be traveled during the test; and speed information indicative of the speed of the actor during the test. The mission data may be provided by the computer 242, the base station 252, or the SDS 102.

The controller 236 controls the test rover apparatus 100 to travel to its starting location based on the waypoint information, and await further instructions. At step 1804, the controller 236 receives an armed signal and prepares the test rover apparatus 100 to perform its mission.

At step 1806 the controller 236 receives a trigger signal and starts performing its mission at step 1808. The trigger signal may be sent by the computer 242 in response to the vehicle 104 passing a predetermined waypoint located relative to the test rover apparatus 100, such as the waypoint 1514 described with reference to FIGS. 15A-15C. Then the controller 236 controls the test rover apparatus 100 to perform its mission. For example, the controller 236 may control the actuator 792 of the steering system 788 and the motors 868, 870 to drive the test rover apparatus 100 at a predetermined speed on a predetermined route.

At step 1810, once the test rover apparatus 100 has completed its mission, it disarms or shuts down. The test rover apparatus 100 may also return to a base, such as the base station 252 before disarming. The test rover apparatus 100 records test data during its mission that is indicative of its performance, such as its location and speed. At step 1810 the test rover apparatus 100 provides its test data to one or more other controllers. For example, the test rover apparatus 100 may return to the base station 252 and automatically download its test data to the base station 252 by wired or wireless communication. The base station 252 processes the test data and uploads it to a cloud-based autonomous data warehouse (ADW) database.

This test data may be compared to the vehicle test data to determine if the SDS 102 is identifying the test rover apparatus 100 location as expected. The test data may also be used to validate simulation testing. The test rover apparatus 100 may also be remotely controlled by an operator, and routes that are generated from such manual mode operation that invoke interesting AV responses may be stored and either (a) reused later or (b) sent into simulation to be simulated road actor routes to virtually validate AV and SW changes.

Automatically distributing the test data from a test rover apparatus improves test efficiency by providing a more automatic, organized and cloud-centered way of extracting, storing and retrieving test data logs, especially when using multiple test rover apparatuses, as compared to existing technology that relies on manual operation for such data transfer.

Figure 19:
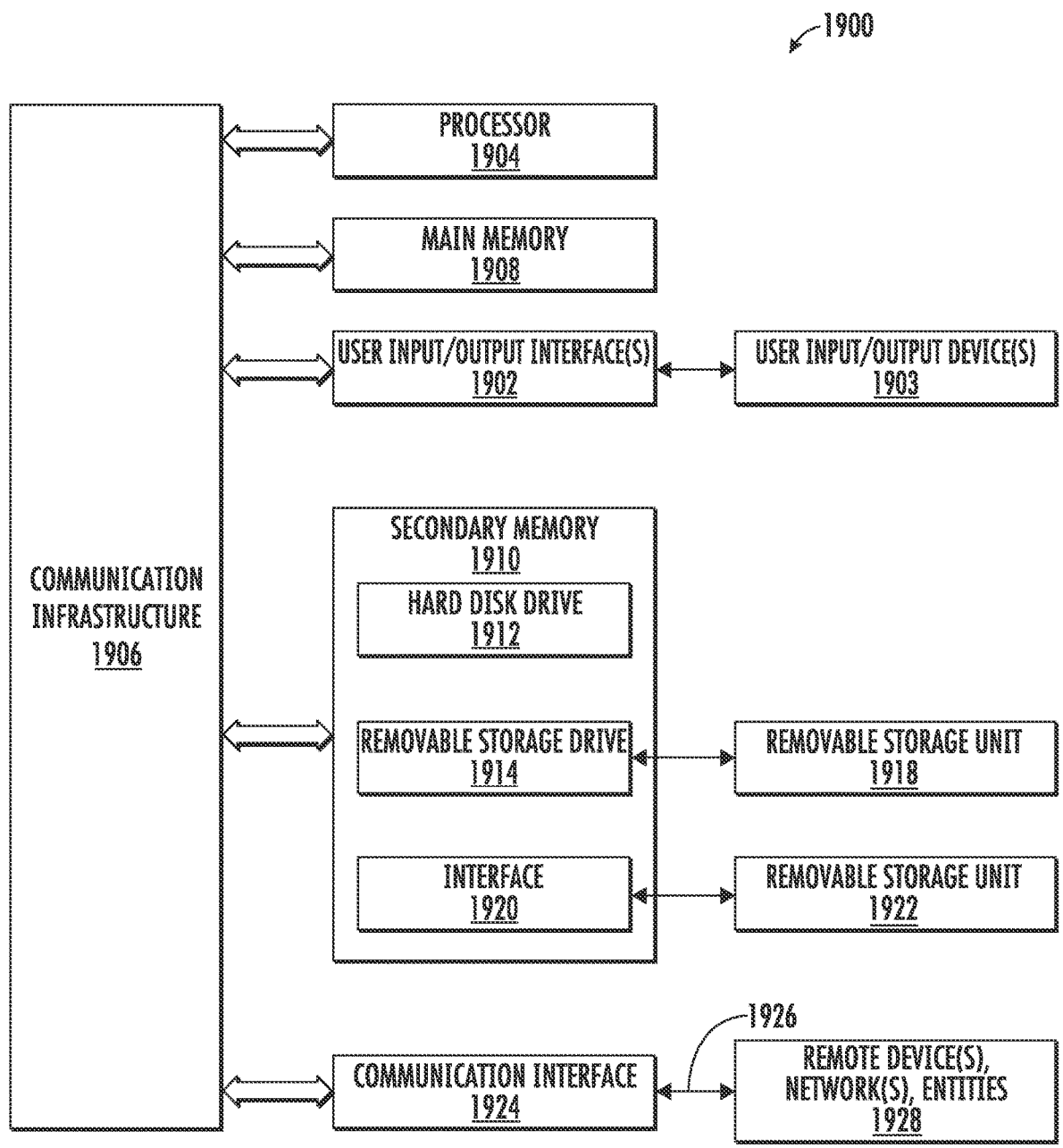
FIG. 19 is a detailed schematic diagram of an example computer system for implementing various embodiments, in accordance with aspects of the disclosure.

The test rover apparatus 100 may include one or more controllers, such as computer system 1900 shown in FIG. 19. The computer system 1900 may be any computer capable of performing the functions described herein. The computer system 1900 also includes user input/output interface(s) 1902 and user input/output device(s) 1903, such as buttons, monitors, keyboards, pointing devices, etc.

The computer system 1900 includes one or more processors (also called central processing units, or CPUs), such as a processor 1904. The processor 1904 is connected to a communication infrastructure or bus 1906. The processor 1904 may be a graphics processing unit (GPU), e.g., a specialized electronic circuit designed to process mathematically intensive applications, with a parallel structure for parallel processing large blocks of data, such as mathematically intensive data common to computer graphics applications, images, videos, etc.

The computer system 1900 also includes a main memory 1908, such as random-access memory (RAM), that includes one or more levels of cache and stored control logic (i.e., computer software) and/or data. The computer system 1900 may also include one or more secondary storage devices or secondary memory 1910, e.g., a hard disk drive 1912; and/or a removable storage device 1914 that may interact with a removable storage unit 1918. The removable storage device 1914 and the removable storage unit 1918 may be a floppy disk drive, a magnetic tape drive, a compact disk drive, an optical storage device, tape backup device, and/or any other storage device/drive.

The secondary memory 1910 may include other means, instrumentalities or other approaches for allowing computer programs and/or other instructions and/or data to be accessed by computer system 1900, e.g., an interface 1920 and a removable storage unit 1922, e.g., a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 1900 may further include a network or communication interface 1924 to communicate and interact with any combination of remote devices, remote networks, remote entities, etc. (individually and collectively referenced by reference number 1928). For example, the communication interface 1924 may allow the computer system 1900 to communicate with remote devices 1928 over a communication path 1926, which may be wired and/or wireless, and which may include any combination of LANs, WANs, the Internet, etc. The control logic and/or data may be transmitted to and from computer system 1900 via communication path 1926.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, the computer system 1900, the main memory 1908, the secondary memory 1910, and the removable storage units 1918 and 1922, as well as tangible articles of manufacture embodying any combination of the foregoing. Such control logic, when executed by one or more data processing devices (such as the computer system 1900), causes such data processing devices to operate as described herein.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. A "self-driving vehicle" or "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Notably, the present solution is being described herein in the context of an autonomous vehicle. However, the present solution is not limited to autonomous vehicle applications. The present solution may be used in other applications such as an advanced driver assistance system (ADAS), robotic applications, radar system applications, metric applications, and/or system performance applications.

Based on the teachings contained in this disclosure, it will be apparent to persons skilled in the relevant art(s) how to make and use embodiments of this disclosure using data processing devices, computer systems and/or computer architectures other than that shown in FIG. 19. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "aspects," "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other. The breadth and scope of this disclosure should not be limited by any of the above-described exemplary embodiments, but should be defined only in accordance with the following claims and their equivalents.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A test rover apparatus comprising:
   a chassis with a sidewall extending between a base and a top to define a cavity, the chassis being configured to support an object representing a mobile actor;
   at least one wheel;
   a motor coupled to the at least one wheel;
   at least one spring coupled between the at least one wheel and the chassis, the at least one spring being configured to:
   bias the at least one wheel to extend out of the cavity to engage an underlying surface, and
   compress in response to a load being applied to the top of the chassis thereby retracting the at least one wheel into the cavity such that the base of the chassis contacts the underlying surface; and
   a controller configured to control the motor to drive the at least one wheel to propel the chassis along a predetermined route, wherein the predetermined route is based on simulation data and corresponds to a maneuver of the mobile actor, and wherein the simulation data comprises a simulated environment and a model of the mobile actor performing the maneuver within the simulated environment.

2. The test rover apparatus of claim 1, wherein the at least one wheel comprises a rear wheel, the test rover apparatus further comprising:
   a frame mounted to the chassis; and
   a bracket pivotally connected to the frame about a first axis, wherein the motor is coupled to the rear wheel and supported by the bracket.

3. The test rover apparatus of claim 2 further comprising:
   a collar fixed to the frame; and
   a post with a proximal end pivotally connected to the bracket and a distal end extending through the collar;
   wherein the at least one spring comprises a rear spring disposed on the post between the proximal end and the collar, the rear spring being configured to bias the bracket downward thereby extending the rear wheel out of the cavity to engage the underlying surface.

4. The test rover apparatus of claim 1, wherein the at least one wheel comprises a front wheel, the test rover apparatus further comprising:
   a knuckle coupled to the front wheel;
   a pivot shaft supported by the knuckle;
   a linkage comprising a central region pivotally connected to the pivot shaft, a distal end connected to the front wheel, and a proximal end;
   a post extending from the knuckle;
   a seat formed at an end of the post; and
   a coupling mounted for translation along the post and connected to the distal end of the linkage;
   wherein the at least one spring comprises a front spring disposed on the post between the coupling and the seat, the front spring being configured to bias the coupling toward the knuckle thereby extending the front wheel out of the cavity to engage the underlying surface.

5. The test rover apparatus of claim 4, wherein the knuckle further comprises a pair of knuckles, each knuckle being mounted for rotation about a vertical axis, and wherein the at least one wheel comprises a pair of front wheels, the test rover apparatus further comprising:
- a tie rod connected between the pair of knuckles; and
- a steering actuator with an output crank coupled to the tie rod by a rocker-slider mechanism such that pivotal motion of the output crank translates the tie rod thereby pivoting the pair of front wheels about the vertical axes.

6. The test rover apparatus of claim 1, wherein the controller is further configured to control the motor to initiate propulsion of the chassis along the predetermined route in response to receipt of a trigger signal and wherein the trigger signal is transmitted in response to a test vehicle being located at a predetermined waypoint.

7. The test rover apparatus of claim 1, wherein the controller is further configured to:
- capture test data during propulsion of the chassis along the predetermined route; and
- transmit the test data.

8. The test rover apparatus of claim 7, wherein the controller is further configured to:
- control the motor to propel the chassis to a waypoint indicative of a location of a base station; and
- transmit the test data to the base station.

9. A test system comprising:
- a computer configured to generate a predetermined route based on simulation data, the predetermined route being indicative of a maneuver of a mobile actor, wherein the simulation data comprises a simulated environment and a model of the mobile actor performing the maneuver within the simulated environment;
- a test rover apparatus comprising:
  - a chassis configured to support an object representing the mobile actor,
  - a motor supported by the chassis and coupled to at least one wheel, and
  - a controller configured to control the motor to propel the test rover apparatus along the predetermined route; and
- a vehicle system comprising at least one optical sensor configured to detect the object representing the mobile actor external to a test vehicle.

10. The test system of claim 9, wherein the vehicle system further comprises a processor configured to adjust at least one of a vehicle speed and a steering angle of the test vehicle in response to detection of the object representing the mobile actor.

11. The test system of claim 9, wherein the computer is further configured to transmit a trigger signal in response to a location of the test vehicle corresponding to a predetermined waypoint location; and
- wherein the controller is further configured to control the motor to initiate propulsion of the test rover apparatus along the predetermined route in response to receipt of the trigger signal.

12. The test system of claim 9 further comprising a base station in communication with the computer and the controller, wherein the base station is configured to provide the predetermined route to the controller.

13. The test system of claim 12, wherein the controller is further configured to:
- capture test data while the test rover apparatus traverses the predetermined route;
- control the motor to propel the test rover apparatus to a waypoint indicative of a location of the base station; and
- transmit the test data to the base station.

14. The test system of claim 13, wherein the base station is configured to upload the test data to a server.

15. The test system of claim 12, wherein the computer is further configured to generate a second predetermined route of a second mobile actor based on the simulation data, the test system further comprising:
- a second test rover apparatus in communication with the base station and configured to:
  - support a second object representing the second mobile actor, and
  - control at least one second motor to propel the second test rover apparatus along the second predetermined route.

16. The test system of claim 9, wherein the test rover apparatus further comprises:
- at least one spring coupled between the at least one wheel and the chassis, the at least one spring being configured to:
  - bias the at least one wheel to extend out of a cavity defined by the chassis to engage an underlying surface; and
  - compress in response to a load being applied to a top of the chassis thereby retracting the at least one wheel into the cavity such that a base of the chassis contacts the underlying surface.

17. A method for testing a vehicle system using a test rover apparatus comprising:
- generating, by one or more processors, a predetermined route based on simulation data, wherein the predetermined route is indicative of a maneuver of a mobile actor relative to a test vehicle, and wherein the simulation data comprises a simulated environment and a model of the mobile actor performing the maneuver within the simulated environment;
- controlling, by the one or more processors, at least one motor to propel a test rover apparatus along the predetermined route, wherein the test rover apparatus is configured to support an object representing the mobile actor; and
- detecting, by the one or more processors, the object representing the mobile actor external to a test vehicle.

18. The method of claim 17 further comprising capturing test data while the test rover apparatus traverses the predetermined route.

19. The method of claim 18 further comprising uploading the test data to a server.

20. The method of claim 18 further comprising generating simulation data based on the test data.

* * * * *